United States Patent Office 2,837,568
Patented June 3, 1958

2,837,568
BIS(HALOPHENYLIMINO)CYCLOHEXANES

Markus Zimmermann, Evanston, Ill., assignor to G. D. Searle & Co., Chicago, Ill., a corporation of Delaware No Drawing. Application May 28, 1956
Serial No. 587,498

6 Claims. (Cl. 260—566)

This invention relates to 1,3-bis(phenylimino)-cyclohexane derivatives which can be represented by the formula

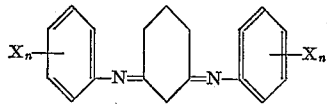

wherein X is halogen, hydroxyl or alkoxy and $n$ is 1 or 2. However, the compounds may exist in one or more resonating forms in which double bonds may shift into the cyclohexane ring and these forms are included in the scope of the invention.

The compounds of the invention have pharmaceutical utility and in particular are characterized by activity against fungi, the halogen derivatives especially are useful, for example, for topical application in alcohol solution for human and veterinary therapy. The alkoxy derivatives also exhibit diuretic activity in promoting the excretion of sodium.

The compounds of the invention are prepared by heating for a short period of time the appropriate substituted aniline with dihydroresorcinol at an elevated temperature, for example, 150-200 degrees. If desired, solvents or diluents such as acetic acid, butanol, xylene and the like may be used. On cooling, water is added and the mixture made alkaline. The product in the form of its free base is obtained by extracting with a solvent such as ether and evaporating to dryness. Alternatively, the reaction product if desired in the form of its acid addition salt is obtained by adding to the reaction mixture an excess of an appropriate acid. For example, hydrochloric acid is added to convert the product to a salt after which the mixture is evaporated to dryness and the residue recrystallized from an appropriate solvent such as ethanol-ethyl acetate. Suitable acids are the halogen acids such as hydrochloric or hydrobromic, sulfuric acid and organic acids such as acetic, tartaric, citric and the like.

Alternatively, the desired substituted aniline is heated with 3-chloro-cyclohex-2-en-one in an inert solvent such as xylene, butanone and the like. On removal of the solvent or diluent, the residue is recrystallized from an appropriate solvent such as ethanol-ethyl acetate to yield, in this case, the hydrochloride salt of the reaction product.

The substituted aniline derivatives are chosen from the aminophenols, such as ortho- and para-aminophenol or aminoresorcinol, alkoxyanilines such as ortho- or para-anisidine and the corresponding ethoxy, propoxy or butoxy derivatives or the like, or halogenated aniline derivatives such as ortho-, meta-, or para-chloroaniline, the corresponding bromine derivatives or the dihalogen substituted anilines.

The invention is described in greater detail in the examples below which are presented by way of illustration and not of limitation. Parts by weight bear the same relation to parts by volume as grams to milliliters. Temperatures are given in degrees centigrade.

Example 1

A mixture of 20 parts by weight of dihydroresorcinol, 80 parts by weight of dry chloroform and 8.2 parts by weight of phosphorous trichloride is refluxed for two hours after which the reaction mixture is poured into ice water and extracted with ether. The ether extract is washed with cold sodium carbonate solution, then with water and dried over calcium chloride. After evaporation of the ether, 3-chloro-cyclohex-2-en-one is obtained as a light yellow oil.

2 parts by weight of 3-chloro-cyclohex-2-en-one, 3.36 parts by weight of para-hydroxyaniline and 50 parts by volume of butanone are refluxed for 2 hours. The reaction mixture is evaporated to dryness and the residue crystallized from a mixture of ethyl alcohol and ethyl acetate. After an additional recrystallization using activated carbon, N,N'-bis-(p-hydroxyphenyl)-cyclohexane-1,3-diimine hydrochloride is obtained; melting point 280° (dec.).

By substituting paramethoxyaniline for the para-hydroxyaniline there is obtained the corresponding N,N'-bis-(p-methoxyphenyl)-cyclohexane - 1,3-diimine hydrochloride, melting point 255–259° (dec.).

By substituting p-ethoxyaniline for the p-hydroxyaniline there is obtained the corresponding N,N'-bis-(p-ethoxyphenyl) - cyclohexane - 1,3-diimine hydrochloride, which decomposes above 200°.

Example 2

A mixture of 3 parts by weight of dihydroresorcinol, 7 parts by weight of para-chloroaniline and one-half part by volume of glacial acetic acid is heated at 170-180° bath temperature, for 20 minutes under reflux, and then for 20 minutes without the condenser to permit the escape of water. After cooling, the residue is dissolved in a mixture of ethanol and ethyl acetate and the solution treated with an excess of hydrogen chloride in isopropanol. The product, N,N'-bis-(p-chlorophenyl)-cyclohexane-1,3-diimine hydrochloride, is filtered off and recrystallized from isopropanol-water; M. P. 275–280° (dec.).

By substituting p-promoaniline for the p-chloroaniline used above there is obtained N,N'-bis(p-bromophenyl)-cyclohexane-1,3-diimine hydrochloride; M. P. 260–270° (dec.).

By substituting 2,5-dichloroaniline for the p-chloroaniline there is obtained N,N'-bis-(2,5-dichlorophenyl)-cyclohexane-1,3-diimine hydrochloride; M. P. 260–280° (dec.).

Example 3

Three parts by weight of 3-chloro-cyclohex-2-en-one, 5.9 parts by weight of m-chloroaniline and 25 parts by volume of dry benzene is refluxed for two hours. The solvent is evaporated off and the residue dissolved in a mixture of ethanol and ethyl acetate. After recrystallization, N,N'-bis - (m-chlorophenyl) - cyclohexane-1,3-diimine hydrochloride is obtained, M. P. 240–244° (dec.).

What is claimed is:
1. Bis-substituted phenyliminocyclohexane compounds having the formula

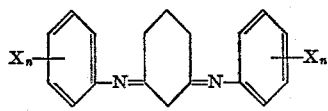

wherein X is selected from the group consisting of hydroxyl, halogen and lower alkoxy and $n$ is a positive integer less than 3.

2. 1,3-Bis(p-methoxyphenylimino)-cyclohexane.
3. 1,3-Bis(p-hydroxyphenylimino)-cyclohexane.
4. 1,3-Bis(p-chlorophenylimino)-cyclohexane.
5. 1,3-Bis(m-chlorophenylimino)-cyclohexane.
6. 1,3-Bis(2,5-dichlorophenylimino)-cyclohexane.

No references cited.

UNITED STATES PATENT OFFICE

Certificate of Correction

Patent No. 2,837,568

June 3, 1958

Markus Zimmermann

It is hereby certified that error appears in the printed specification of the above numbered patent requiring correction and that the said Letters Patent should read as corrected below.

Column 1, lines 18 to 23, the formula should appear as shown below instead of as in the patent—

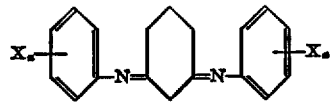

column 2, line 51, for "p-promoaniline" read —p-bromoaniline—.

Signed and sealed this 21st day of October 1958.

[SEAL]

Attest:
KARL H. AXLINE,
*Attesting Officer.*

ROBERT C. WATSON,
*Commissioner of Patents.*